United States Patent [19]

Romanski

[11] Patent Number: 4,539,730
[45] Date of Patent: Sep. 10, 1985

[54] SEAMING MEANS AND A TOOL FOR FORMING THE SEAM

[75] Inventor: Eric R. Romanski, Delmar, N.Y.

[73] Assignee: Albany International Corp., N.Y.

[21] Appl. No.: 525,563

[22] Filed: Aug. 22, 1983

[51] Int. Cl.³ .............................................. A44B 19/40
[52] U.S. Cl. ..................................... 24/33 B; 24/418; 24/419; 139/383 AA; 139/383 A
[58] Field of Search .................... 24/31 V, 33 B, 437, 24/418, 419, 425, 427, 430, 588, 589; 28/116; 245/10; 139/383 AA

[56] References Cited

U.S. PATENT DOCUMENTS

| | | | |
|---|---|---|---|
| 831,050 | 9/1906 | Flanagan | 24/33 B |
| 923,546 | 6/1909 | Maxwell | 24/33 B |
| 1,218,227 | 3/1917 | Talcott | 24/33 B |
| 1,286,574 | 12/1918 | Franklin | 24/33 B |
| 2,907,093 | 10/1959 | Draper, Jr. | 139/383 AA |
| 3,226,789 | 1/1966 | Burbank | 24/419 |
| 3,449,803 | 6/1969 | Manning | 24/418 |
| 4,123,022 | 10/1978 | Dutt et al. | 245/10 |
| 4,141,388 | 2/1979 | Romanski et al. | 139/383 AA |
| 4,344,209 | 8/1982 | Harwood | 139/383 AA |

FOREIGN PATENT DOCUMENTS

| | | |
|---|---|---|
| 0039850 | 11/1981 | European Pat. Off. . |
| 1301467 | 12/1972 | United Kingdom . |
| 1375913 | 12/1974 | United Kingdom . |
| 1580250 | 11/1980 | United Kingdom . |

*Primary Examiner*—Victor N. Sakran
*Attorney, Agent, or Firm*—Kane, Dalsimer, Kane Sullivan & Kurucz

[57] ABSTRACT

A seam for joining the ends of a fabric to form an endless belt which can be used for papermaking, is created by attaching a continuous coil to each fabric end, the loops of the coils being preformed so that when the loops are intermeshed each loop of one coil engages or creates an interference fit, with two loops of the opposite coil. To strengthen the seam, a pin is inserted in the tube formed by the intermeshed loops.

The loops are joined by using a tool which has two channels through which the ends are brought together. The channels are formed between two plates attached to the ends of scissor arms.

5 Claims, 9 Drawing Figures

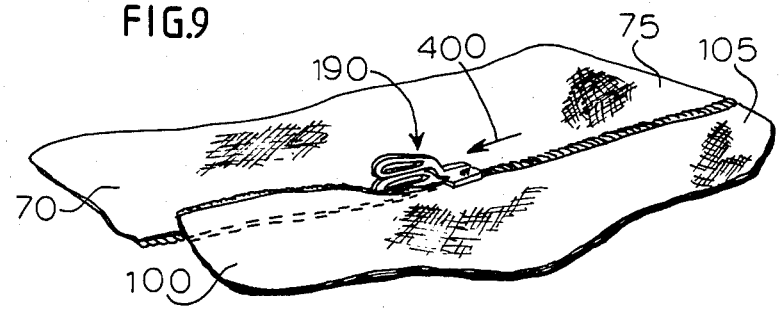
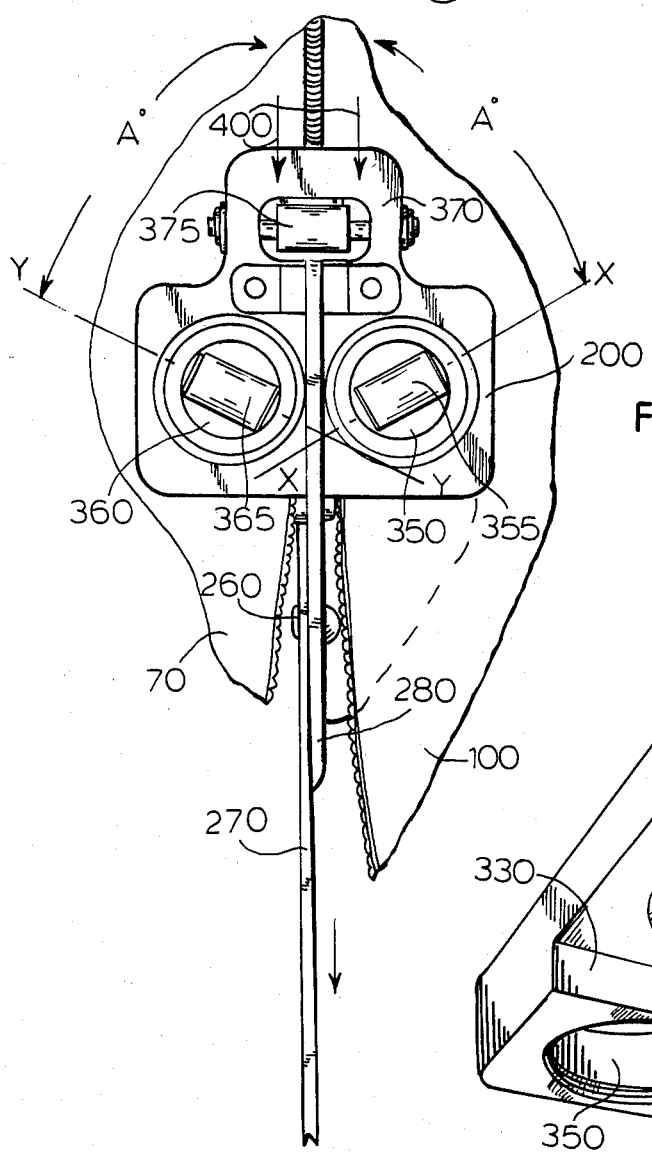

SEAMING MEANS AND A TOOL FOR FORMING THE SEAM

BACKGROUND OF THE INVENTION

1. Field of Invention

This invention relates to seaming means, a method and apparatus for forming the seam, and more particularly to a self-locking seam which can be used to join the two ends of a piece of fabric to create an endless belt.

2. Description of the Prior Art

Endless belts made out of woven fabric materials are used in a number of fields. Their use is especially prominent in the papermaking industry where such belts are used in the forming, pressing and drying of continuous sheets of paper. In order to insure that the belts in this industry have a long useful life the seams must be strong. On the other hand, the seams cannot exhibit substantial surface variations, or they will mark the paper.

One type of seam which has proven to be fairly reliable in the paper industry is the so-called pintle seam, such as the one described in the commonly assigned U.S. Pat. No. 4,123,022. These seams comprise intermeshing juxtaposed loops formed on each end of the fabric. There are several methods which may be used to secure the loops to the belt fabric. For example, the loops may be sewn on a webbing and then the webbing may be secured to the belt fabric. Another method is to fold over the ends of the fabric and to insert a spiral coil formed of interconnected loops between the fabric threads. A third method comprises reweaving the machine direction yarns back into the fabric after they are shaped into loops. All these seam loops have a distinct disadvantage in that they are very time consuming to mesh together. For example, after the loops have been secured to the fabric ends by using one of the methods outlined above, depending on the width and fineness of the fabric, it takes between one-half and eight hours to join the ends to form the belt. Furthermore, at least two persons are needed to mesh loops and push the pin through the loops respectively, and several other persons are required to hold down the rest of the fabric. This is also compounded if the meshing location is not in a convenient place, i.e. working upside down.

OBJECTIVES AND SUMMARY OF THE INVENTION

In view of the above-described disadvantages of prior art seams, the objective of the present invention is to provide a seam which can be used to join the ends of a fabric in a short period of time.

A further objective is to provide a seam with which two ends of a wide fabric may be joined by one or two persons.

A further objective is to provide a device for joining the seam loops fast and efficiently. Other objectives and advantages are described in the description of the preferred embodiment.

The above objectives are realized by a seam comprising two coils which are affixed respectively to the ends of a fabric, at least one of the coils being performed to interlock with the other so that after the coils are intermeshed there is an interference fit therebetween. The interlocked loops define a tubular orifice across the width of the fabric through which a pintle can be introduced to re-inforce the seam and create a positive lock.

Since the loops of one end actually grip the respective loops of the other end rather than being merely intermeshed, a force is required to overcome the elasticity of the loops and bring the loops together. This force is generated by a device which first superimposes the two ends of the fabric so that the ends are displaced along a plane which is substantially perpendicular to the fabric ends and then forces the coils together as the device slides along the ends to form the seam.

BRIEF DESCRIPTION OF THE DRAWINGS

FIG. 7 is a partial top view of the tool of FIG. 6;

FIG. 8 is a partial bottom view the top pressure plate; and

FIG. 9 shows a seam being completed by the tool of FIG. 6.

DESCRIPTION OF THE PREFERRED EMBODIMENT

Joining edges of fabrics by devices known as zippers is well known, especially in the garment industry. These zippers traditionally comprise two tapes, each fastened to a fabric end at one edge, with a series of plastic or metal teeth disposed along the opposite edges of the tape, said teeth being interconnected to each other when they are intermeshed by a slide by an interference fit between the teeth of one tape and the corresponding opposite teeth of the other. The teeth are clamped or otherwise permanently fastened to the tapes.

A recent development in these devices has been the use of a continuous series of interconnected loops for each tape instead of the individual teeth, which are sewn on to said opposite edges of the tapes. The inventor has found that these continuous loops, which from hereon shall be called coils, can also be used to form a seam for continuous fabric belts even if the fabrics are very stiff and are woven out of relatively thick, rigid plastic threads, such as the one normally used for forming fabrics and dryer fabrics.

Figure 1:
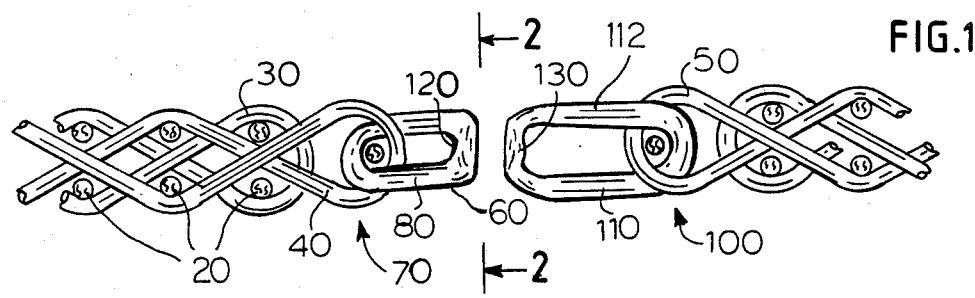
FIG. 1 shows a side view of the fabric ends and the seam coils.

A typical dryer fabric of the type described above is shown in FIG. 1. It comprises two rows of weft yarns 10, 20 between which the warp yarns 30, 40 are woven in the usual manner. After the last row of weft yarns each warp yarn is folded back into a loop 50 after which it is woven back into the fabric by using a hand weaving device. This process is more fully disclosed in the copending U.S. application Ser. No. 085,902 filed on Oct. 18, 1979. The threads are preferably fairly rigid plastic monofilaments to impart the fabric the required stiffness.

A continuous coil 60 is attached to the fabric end 70 formed by loops 50, preferably by threading it through loops 70 before the warp yarns are rewoven into the fabric as described above. The coil is formed of a plurality of loops 60, each loop being interconnected to the adjacent loops. Each loop is in the shape of a relatively flat ellipse. The plane of all the loops of a coil are substantially in parallel, lie perpendicularly to the plane of the fabric and extend away from the respective fabric end.

Figure 2:
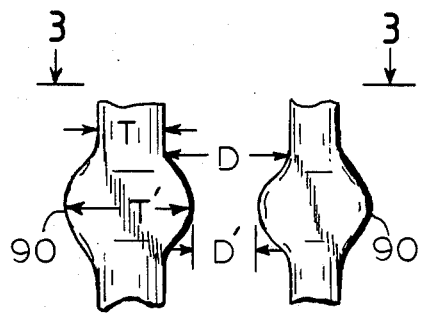
FIG. 2 is an end view of the seam coils of FIG. 1.
Figure 3:
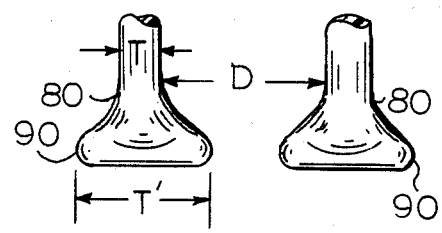
FIG. 3 is a top view of the seam coils of FIG. 1.

The coil is preferably a nylon or polyester monofilament. The end of each loop 80 opposing the fabric end is distorted to form a head 90 which has width T' in the perpendicular direction to the ellipse plane which is larger than the normal thickness T of the monofilament. As can be seen in FIGS. 2 and 3, each successive loop is spaced at a distance D from the previous loops. However because the heads 90 are thicker than the rest of the loops so that the distance D' between the heads is smaller than the thickness T.

The other end 100 of the fabric is finished in the identical manner to end 70 with a coil 110 which is identical to coil 60. The loops 112 of coil 110 are in parallel to the loops 80 of coil 60.

Coils 60 and 110 respectively are further secured to ends 70 and 100 by retaining pins 85 and 115 which are introduced alternatively between the fabric ends and the coil loops.

Figure 4:
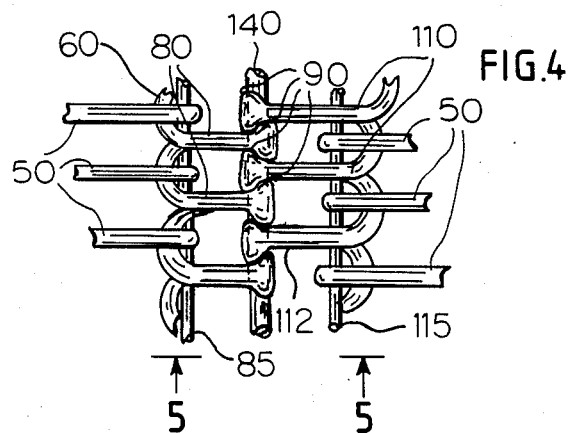
FIG. 4 is a plan view of the completed seam.
Figure 5:
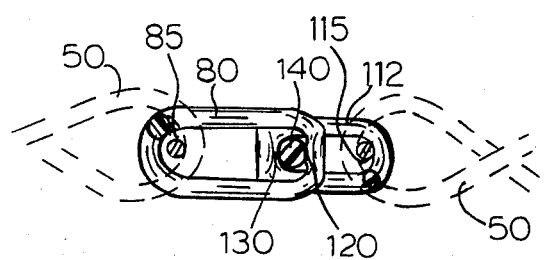
FIG. 5 is a side view of the seam of FIG. 4.

The seam is completed by joining the two ends 70 and 100 together, thereby forcing the loops 80 and 100 to intermesh. This action forces the head of each loop of one end to be inserted in between and engage two corresponding loops of the other end, as shown in FIGS. 4 and 5 to form an interference fit therebetween. For best results the distance D between adjacent loops of a coil is substantially the same as the filament thickness T so that, when the respective loops are intermeshed, each loop is in physical contact with the loops of the opposite coil. The head of the loop is actually disposed inside the adjacent loops, as shown in FIG. 4. For clarity, the loops in FIG. 4 are shown slightly spread apart so that D is larger than T. A dryer fabric was joined in this manner and it was found that the seam had a tensile strength in excess of 200 pounds per linear inch.

Importantly, the respective loops from the opposing coils overlap enough in the closed position shown in FIGS. 4 and 5 so that inner face 120 of coil 80 and inner face 130 of coil 112 both of which are substantially semi-cylindrical as viewed from the side complement each other, and define a substantially tubular space tube through the seam across the width of the fabric. A pin 140 is passed through the tubular space to secure the coils to each other, and thereby strengthen the seam. The pin may be a rigid metal pin or a plastic monofilament. It has been found that the tensile strength of the dryer fabric is dramatically increased by the pin from 200 to over 500 lbs per linear inch.

The force necessary to intermesh the individual loops is relatively small so that the above-described seam may be closed manually, preferably by starting on one side and pushing carefully the two ends together. However this process is rather tedious and for belts in excess of 3–4 feet in width, more than one person is needed to complete it. Therefore a tool has been devised for closing the seam in an expeditious manner.

Figure 6:
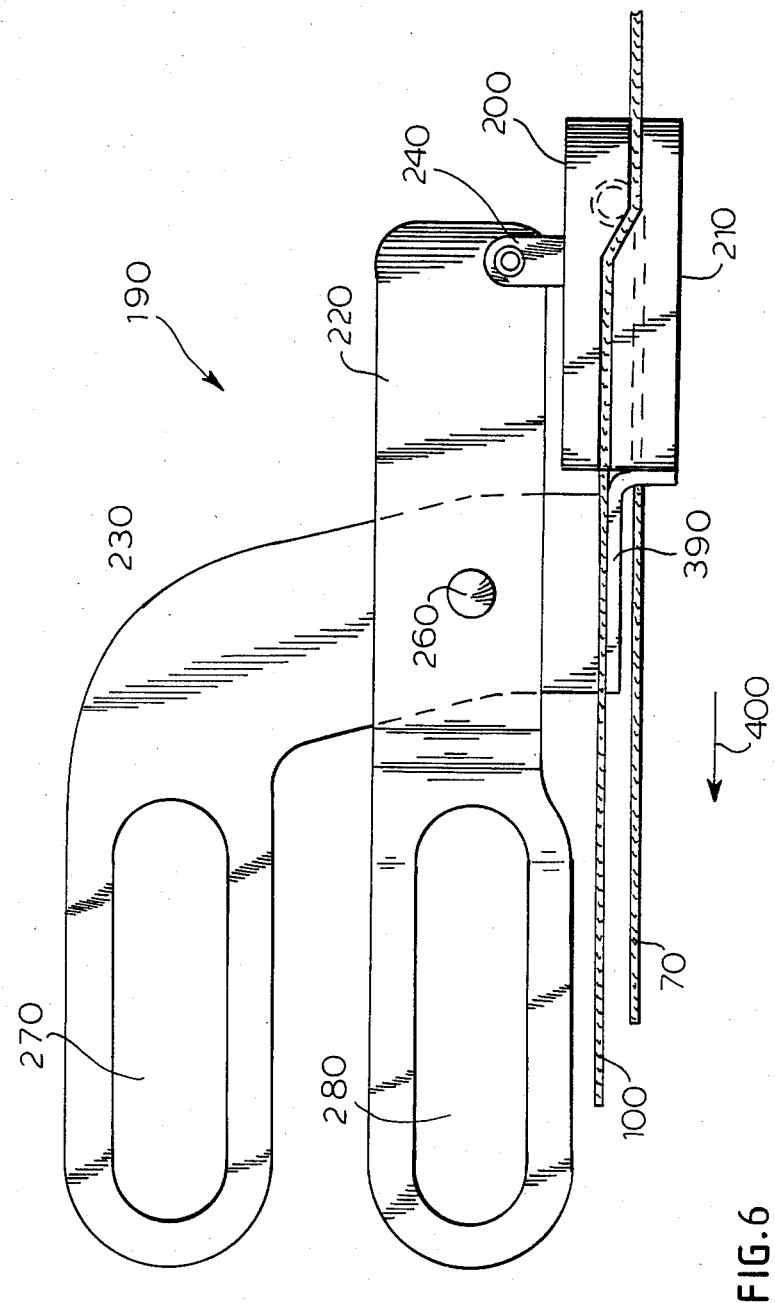
FIG. 6 is a side view of the tool used to complete the seam.

The tool 190 illustrated in FIGS. 6–8 comprises a top and a bottom pressure plate 200, 210, which are brought into an opposing relationship as shown in FIG. 6 by the two scissored arms 220 and 230 respectively. Plate 200 is joined to arm 220 by a vertical stud 240 while plate 210 is joined to arm 230 by screw means 250. The arms are rotatably joined by pivoting screw 260. Each arm has a handle hole 270 and 280 provided to enable to hold and operate the tool just like a regular scissor. Separating the handle ends also separates the plates and vice versa.

The top plate 200 is illustrated in more details in FIG. 8. The bottom surface of the plate comprises a first substantially flat area 290, a second substantially flat area 300 which is essentially coplanar with the first area 290 and a third substantially flat area 310.

When the tool is used to close a seam, it is moved in the direction shown by arrow 400 so that while the first and third areas are adjacent to each other the second area is "downstream" with respect to both of them. The first and third areas are joined by a substantially vertical wall 330 which, as shall be seen later, defines the plane in which the coils are joined. As shown in FIG. 8, the third area 310 is offset vertically from the first and second areas 290 and 300 and furthermore it is positioned above said area. The vertical distance therebetween is about half an inch. A slanted area 340 joins the second area 300 to the third area 310. Holes 350, 360, and 370 are provided in each of the plates to hold pressure rollers. The function of these rollers shall be described below.

The bottom plate 210 has a top surface which is complementary to the bottom surface of the top plate so that the two plates may be brought into a mating relationship as shown in FIG. 6.

The above mentioned pressure rollers are illustrated in FIG. 7. One pressure roller 375 is installed in hole 370 so that its axis of rotation is transversal to the direction of movement of the tool 190 indicated by the arrow. Rollers 355 and 365 are installed respectively symmetrically in holes 350 and 360. Their axis of rotation X—X and Y—Y form an angle A with said direction of movement which, as shown in FIG. 7, is less than 90°. For example, angle A may be 60°. The bottom plate is provided with similar rollers disposed beneath the top rollers so that when a fabric is introduced therebetween, pressure nips are formed between the respective rollers.

The tool operates as follows. As the two plates are positioned close to each other two channels are formed therebetween. The lower channel is essentially horizontal and is defined by the first area 290, second area 300 and corresponding areas of the bottom plate. The higher channel starts off in parallel with the lower channel and is defined by third area 310, vertical wall 330 and the corresponding areas of the lower plate. The upper channel then angles toward and joins the lower channel as it follows inclined surface 340. Thus the two channels form a Y.

In order to use the tool, corners 75 and 105 of respective fabric ends 70 and 100 are inserted between the plates 200, 210 of tool 190, the handles are gripped to apply pressure to the fabric and the tool is moved in the direction of the arrow 400 of FIG. 9. As shown in FIG. 6, end 100 passes through the higher channel while end 70 passes through the lower channel. As the ends pass through the tool, they are forced toward a common vertical plane defined by wall 330. In this manner the tool insures that just before the coils 80 and 110 are enmeshed they are juxtaposed along a substantially vertical plane, parallel with vertical wall 330. The actual meshing of the coils takes place as the loops of coil 110 of the upper end 100 are pushed into the loops of coil 80 of the lower end 100 as the upper end is traveling along the inclined surface 340. This action is aided by roller 375 which presses against the loops. By the time the two ends reach the second area 300, the coils are joined so that the ends are coplanar and have been seamed as shown in FIGS. 4 and 5.

A substantially horizontal guide 390 is attached to the upper plate to guide end 100 between the two plates.

The overall width of the tool is in the range of 3-5 inches, so that it is not too big to be manipulated with one hand. As the arms of the tool are squeezed together the plates are forced against the fabric ends and the rollers. Preferably the distance from the handle holes 270 and 280 to the pivot 260 is larger than the distance from the pivot point to the plates so that a mechanical advantage can be generated.

The inventor has found that by using the above-mentioned tool and seam means even a twenty foot wide belt may be formed by joining the respective fabric ends in less than a minute. Since the coils are joined by the interference fit and in effect are self-locking, only two people are needed to join the fabric end; one to hold the fabric ends while the other one forces the coils to intermesh. Once the coils are interlocked a slight tension is applied to them to keep them straight. In this position the heads of the loops interlock to create the tube as shown in FIG. 5, allowing the pintle 140 to be inserted therebetween. A single person is able to push the pintle across the whole width of the fabric.

One major feature of the tool is that, as described above, it overlaps the two ends while keeping them offset so that they are not coplanar. This feature is important especially when fabric is a stiff dryer fabric. Normally such fabrics exhibit two dimensional stability. In other words, they resist forces that are co-planar with the fabric. If a force which is coplanar with the fabric is applied to the fabric edge, the fabric will resist the force and it will contort in a direction normal to its plane. Normally the edges of two fabrics are zipped by placing the edges side by side in essentially the same plane as the two fabrics. Thus, while the edges are being joined, the seam and the remaining portions of the edges form a Y in the plane of the fabrics. However dryer fabrics could not be zippered in this manner for the reasons outlined above. The tool presented herein above solves this problem by zippering two fabrics such that the seam and the two edge portions form a Y (as shown in FIG. 6) which is normal to the planes of the fabrics. Numerous modifications may be made to the invention without departing from its scope as defined in the appended claims.

I claim:

1. A seam for joining first and second ends of a fabric used in papermaking, without a backing material, to create an endless belt comprising:

a plurality of first end loops attached to said first end;

a plurality of second end loops attached to said second end;

a first coil formed of continuous first coil loops spaced at a predetermined distance;

second coil formed of continuous second coil loops spaced at a predetermined distance; and each said first and second coil loops engaging the respective end loops for securing the coils to the respective fabric ends;

each coil loop having a portion disposed opposite the respective end, said portion being wider than said preselected distance to interlock the loops of one of the coils to corresponding loops of the other coil in a male-female engagement when said first and second coils are intermeshed;

said first and second coils being arranged and constructed to form a space therebetween when intermeshed for an additional locking means.

2. The seam of claim 1 wherein said coils comprise zipper coils.

3. The seam of claim 1 further comprising a locking means disposed within said space.

4. The seam of claim 3 wherein said locking means comprising a plastic monofilament pin.

5. The seam of claim 1 wherein said coil loops have a T-shaped cross-section.

* * * * *